(12) United States Patent
Kodemura et al.

(10) Patent No.: US 12,503,584 B2
(45) Date of Patent: Dec. 23, 2025

(54) LATEX COMPOSITION PRODUCTION METHOD

(71) Applicant: ZEON CORPORATION, Tokyo (JP)

(72) Inventors: Junji Kodemura, Tokyo (JP); Misa Hayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 695 days.

(21) Appl. No.: 17/800,684

(22) PCT Filed: Feb. 8, 2021

(86) PCT No.: PCT/JP2021/004671
§ 371 (c)(1),
(2) Date: Aug. 18, 2022

(87) PCT Pub. No.: WO2021/166725
PCT Pub. Date: Aug. 26, 2021

(65) Prior Publication Data
US 2023/0070718 A1 Mar. 9, 2023

(30) Foreign Application Priority Data
Feb. 20, 2020 (JP) ................................ 2020-027169

(51) Int. Cl.
| | | |
|---|---|---|
| *C08L 47/00* | (2006.01) | |
| *B29C 41/14* | (2006.01) | |
| *B29K 9/00* | (2006.01) | |
| *C08F 136/08* | (2006.01) | |
| *C08K 3/06* | (2006.01) | |
| *C08K 3/22* | (2006.01) | |
| *C08K 5/38* | (2006.01) | |
| *C08K 5/42* | (2006.01) | |
| *C08K 13/02* | (2006.01) | |

(52) U.S. Cl.
CPC ............ *C08L 47/00* (2013.01); *C08F 136/08* (2013.01); *C08K 13/02* (2013.01); *B29C 41/14* (2013.01); *B29K 2009/00* (2013.01); *C08K 3/06* (2013.01); *C08K 3/22* (2013.01); *C08K 5/38* (2013.01); *C08K 5/42* (2013.01); *C08L 2201/52* (2013.01)

(58) Field of Classification Search
CPC .... C08L 47/00; C08L 2201/52; C08F 136/08; C08K 13/02; C08K 3/06; C08K 3/22; C08K 5/38; C08K 5/42; B29C 41/14; B29K 2009/00
See application file for complete search history.

(56) References Cited

U.S. PATENT DOCUMENTS

2015/0376322 A1   12/2015   Nakamura et al.
2023/0103092 A1*  3/2023   Kodemura ................ C08L 9/02
                                                                      524/368

FOREIGN PATENT DOCUMENTS

WO   2014/129547 A1   8/2014
WO   2019/058807 A1   3/2019

OTHER PUBLICATIONS

English translation of WO 2019/058807 (Year: 2019).*
Apr. 27, 2021 International Search Report issued in International Patent Application No. PCT/JP2021/004671.
Aug. 23, 2022 International Preliminary Report on Patentability issued in International Patent Application No. PCT/JP2021/004671.
Feb. 21, 2024 Extended European Search Report issued in European Patent Applcation No. 21757921.8.

* cited by examiner

*Primary Examiner* — Angela C Scott
(74) *Attorney, Agent, or Firm* — Oliff PLC

(57) ABSTRACT

A method for producing a latex composition, the method comprising a provision step of providing a conjugated diene polymer latex; a preparation step of adding a sulfur-based vulcanizing agent and a xanthogen compound to the conjugated diene polymer latex to prepare a latex composition before aging; and an aging step of, after the preparation of the latex composition before aging, aging the prepared latex composition before aging through storing of the latex composition at a temperature of 5 to 60° C. for 12 hours to 14 days, wherein the pH of the latex composition after 12 hours from the start of aging in the aging step is controlled to 9 or more.

9 Claims, No Drawings

LATEX COMPOSITION PRODUCTION METHOD

TECHNICAL FIELD

The present invention pertains to a method for producing a latex composition which can provide a molded film, such as a dip molded article, having excellent stability and having excellent tensile strength, tensile elongation, and tear strength. The present invention also pertains to a method for producing a dip molded article using a latex composition produced by such a production method.

BACKGROUND ART

Conventionally, it has been known that molded films, such as dip-molded articles (e.g., teats, balloons, gloves, balloons, and stalls), used in contact with the human body can be obtained by dip molding a latex composition containing natural rubber latex. However, in some cases, such dip-molded articles are not suitable for use in direct contact with the mucosa or organs of a living body because the natural rubber latex contains proteins that may cause immediate (Type I) allergic reactions in the human body. In response to this problem, the removal of proteins in natural rubber latex by purification or the like and the use of a synthetic rubber latex instead of natural rubber latex have been studied.

For example, Patent Document 1 discloses a composition for dip molding which is a latex composition containing zinc oxide, sulfur, and a vulcanization accelerator mixed with a latex of synthetic polyisoprene as a synthetic rubber. Unfortunately, although the technique of Patent Document 1 can avoid the immediate (Type I) allergic reactions to proteins derived from natural rubber, due to the vulcanization accelerator contained therein, dip-molded articles obtained by this technique may sometimes trigger delayed (Type IV) allergic reactions when brought into contact with the human body. In addition, the absence of such a delayed (Type IV) allergy-inducing vulcanization accelerator results in a dip molded article having insufficient tensile strength, tensile elongation, and tear strength. In view of this issue, there is a demand for a dip molded article that is devoid of any delayed (Type IV) allergy-inducing vulcanization accelerators and has enhanced tensile strength, tensile elongation, and tear strength.

RELATED ART

Patent Documents

Patent Document 1: International Publication No. WO 2014/129547

SUMMARY OF THE INVENTION

Problem to be Solved by the Invention

The present invention has been devised in response to the current issues, and an objective thereof is to provide a method for producing a latex composition which can provide a molded film, such as a dip molded article, having excellent stability and having excellent tensile strength, tensile elongation, and tear strength, and to provide a method for producing a dip molded article using a latex composition produced by such a production method.

Means for Solving Problems

As a result of dedicated research to achieve the aforementioned objective, the present inventors have found that the objective can be achieved by pH control to maintain a pH in a specific range after 12 hours from the start of aging in an aging step following preparation of a latex composition.

Specifically, the present invention provides a method for producing a latex composition, the method comprising a provision step of providing a conjugated diene polymer latex; a preparation step of adding a sulfur-based vulcanizing agent and a xanthogen compound to the conjugated diene polymer latex to prepare a latex composition before aging; and an aging step of, after the preparation of the latex composition before aging, aging the prepared latex composition before aging through storing of the latex composition at a temperature of 5 to 60° C. for 12 hours to 14 days, wherein the pH of the latex composition after 12 hours from the start of aging in the aging step is controlled to 9 or more.

In the method for producing a latex composition according to the present invention, the preparation step preferably comprises controlling the pH of the latex composition before aging to 11 or more.

In the method for producing a latex composition according to the present invention, the aging step preferably comprises adding a pH adjuster to the latex composition during aging.

In the method for producing a latex composition according to the present invention, the pH adjuster preferably comprises at least one selected from alkali hydroxides, ammonia, and organic amine compounds.

In the method for producing a latex composition according to the present invention, the amount of the sulfur-based vulcanizing agent used is preferably 0.01 to 3 parts by weight with respect to 100 parts by weight of the conjugated diene polymer contained in the conjugated diene polymer latex.

In the method for producing a latex composition according to the present invention, the amount of the xanthogen compound used is preferably 0.01 to 10 parts by weight with respect to 100 parts by weight of the conjugated diene polymer contained in the conjugated diene polymer latex.

In the method for producing a latex composition according to the present invention, the preparation step preferably comprises further adding a strong acid salt-based surfactant to the conjugated diene polymer latex.

In the method for producing a latex composition according to the present invention, the conjugated diene polymer latex is preferably a synthetic polyisoprene latex, a styrene-isoprene-styrene block copolymer latex, or a protein-free natural rubber latex.

In the method for producing a latex composition according to the present invention, the conjugated diene polymer latex is preferably a latex of a conjugated diene polymer having no carboxyl groups.

The present invention also provides a method for producing a dip-molded article, the method comprising the step of dip molding a latex composition produced by the aforementioned production method.

Effects of Invention

The present invention can provide a method for producing a latex composition which can provide a molded film, such as a dip-molded article, having excellent stability and having excellent tensile strength, tensile elongation, and tear strength. The present invention can also provide a method for producing a dip molded article using a latex composition produced by such a production method.

DESCRIPTION OF EMBODIMENTS

A method for producing a latex composition comprises:
a provision step of providing a conjugated diene polymer latex;
a preparation step of adding a sulfur-based vulcanizing agent and a xanthogen compound to the conjugated diene polymer latex to prepare a latex composition before aging; and
an aging step of, after the preparation of the latex composition before aging, aging the prepared latex composition before aging through storing of the latex composition at a temperature of 5 to 60° C. for 12 hours to 14 days,
wherein the pH of the latex composition after 12 hours from the start of aging in the aging step is controlled to 9 or more.

The provision step in the present invention is a step of providing a conjugated diene polymer latex for use in the preparation step described later. The conjugated diene polymer latex used in the present invention may be any latex without limitation as long as a conjugated diene polymer is dispersed in water.

<Conjugated Diene Polymer Latex>

Examples of the conjugated diene polymer latex used in the present invention include, but are not limited to, synthetic isoprene latexes, styrene-isoprene-styrene block copolymer (SIS) latexes, deproteinized natural rubber (protein-free natural rubber) latexes, nitrile group-containing conjugated diene copolymer latexes, and the like. Among these, preferred are latexes of polymers containing isoprene units, such as synthetic isoprene latexes, SIS latexes, and deproteinized natural rubber latexes. In particular, synthetic isoprene latexes are preferred. Although the conjugated diene polymer latex used in the present invention may be a latex of a polymer having a modifying group such as carboxyl group, the conjugated diene polymer latex is preferably a latex of a conjugated diene polymer having no carboxyl groups from the viewpoint of reducing the number of steps for preparation thereof. Any conjugated diene polymer having no carboxyl groups can be chosen as long as the conjugated diene polymer has substantially no carboxyl groups. For example, carboxyl groups may be present in an amount considered as little as that derived from impurities or the like (for example, less than about 0.05% by weight on a monomer unit basis).

In the case of using a synthetic polyisoprene latex as the conjugated diene polymer latex, the synthetic polyisoprene in the synthetic polyisoprene latex may be an isoprene homopolymer or may be a copolymer of isoprene and a different ethylenically unsaturated monomer copolymerizable with isoprene. The content of isoprene units in the synthetic polyisoprene is preferably 708 by weight or more, more preferably 90% by weight or more, still more preferably 95% by weight or more, particularly preferably 100% by weight (homopolymer of isoprene) with respect to the total monomer units for ease of obtaining a molded film, such as a dip-molded article, which is flexible and has excellent tensile strength.

Examples of different ethylenically unsaturated monomers copolymerizable with isoprene include conjugated diene monomers other than isoprene, such as butadiene, chloroprene, and 1,3-pentadiene; ethylenically unsaturated nitrile monomers, such as acrylonitrile, methacrylonitrile, fumaronitrile, and α-chloroacrylonitrile; vinyl aromatic monomers, such as styrene and alkyl styrenes; ethylenically unsaturated carboxylic acid ester monomers, such as methyl (meth)acrylate (which means "methyl acrylate and/or methyl methacrylate", and hereinafter, the same applies to ethyl (meth)acrylate and the like), ethyl (meth)acrylate, butyl (meth)acrylate, and 2-ethylhexyl (meth)acrylate; and the like. One of these ethylenically unsaturated monomers copolymerizable with isoprene may be used alone, or two or more of them may be used in combination.

The synthetic polyisoprene can be obtained by conventionally known methods such as solution polymerization of isoprene optionally with a different ethylenically unsaturated copolymerizable monomer in an inert polymerization solvent using a Ziegler polymerization catalyst composed of trialkylaluminum-titanium tetrachloride or an alkyl lithium polymerization catalyst such as n-butyl lithium or sec-butyl lithium. Although the polymer solution of synthetic polyisoprene obtained by the solution polymerization may be used as it is to produce a synthetic polyisoprene latex, solid synthetic isoprene may be extracted from the polymer solution and be dissolved in an organic solvent to prepare a solution, which is then used to produce a synthetic polyisoprene latex.

In the case where a synthetic polyisoprene solution is prepared by the above-mentioned method, impurities including residual polymerization catalyst in the polymer solution may be removed. Further, an antioxidant described below may be added to the solution during or after the polymerization. Alternatively, commercially available solid synthetic polyisoprene may be used.

There are the following four types of isoprene units in the synthetic polyisoprene which differ in bonding geometry of isoprene units: cis bond unit, trans bond unit, 1,2-vinyl bond unit, and 3,4-vinyl bond unit. In order to obtain a molded film, such as a dip-molded article, having enhanced tensile strength, the content of cis bond units among the isoprene units contained in the synthetic polyisoprene is preferably 70 wt % or more, more preferably 90 wt % or more, further more preferably 95 wt % or more with respect to the total isoprene units.

The weight average molecular weight of the synthetic polyisoprene is preferably 10,000 to 5,000,000, more preferably 500,000 to 5,000,000, still more preferably 800,000 to 3,000,000 as calibrated against polystyrene standards by gel permeation chromatography. Adjusting the weight average molecular weight of the synthetic polyisoprene within the above ranges tends to result in a molded film, such as a dip-molded article, having further enhanced tensile strength, tensile elongation, and tear strength and facilitate the production of the synthetic polyisoprene latex.

The polymer Mooney viscosity ($ML_{1+4}$, 100° C.) of the synthetic polyisoprene is preferably 50 to 80, more preferably 60 to 80, sill more preferably 70 to 80.

Examples of methods for providing the synthetic polyisoprene latex include (1) a method for producing the synthetic polyisoprene latex by emulsifying a solution or microsuspension of the synthetic polyisoprene, which is dissolved or finely dispersed in an organic solvent, in water in the presence of an emulsifier, followed by removal of the organic solvent, as required, and (2) a method for directly producing the synthetic polyisoprene latex by emulsion polymerization or suspension polymerization of isoprene alone or a mixture of isoprene with an ethylenically unsaturated monomer copolymerizable with isoprene in the presence of an emulsifier. The aforementioned production method (1) is preferable since this method allows the use of a synthetic polyisoprene in which cis bond units occupy a high proportion of the total isoprene units, and tends to result in a molded film, such as a dip-molded article, having excellent mechanical properties such as tensile strength.

Examples of organic solvents usable in the production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, preferred are alicyclic hydrocarbon solvents and aliphatic hydrocarbon solvents, more preferred are pentane, cyclohexane, and n-hexane, and particularly preferred is n-hexane.

The amount of the organic solvent used is preferably 2,000 parts by weight or less, more preferably 20 to 1,500 parts by weight, still more preferably 500 to 1, 500 parts by weight with respect to 100 parts by weight of the synthetic polyisoprene.

Preferred emulsifiers for use in the production method (1) are ionic emulsifiers. In particular, anionic emulsifiers are more preferred. Specific examples of anionic emulsifiers include fatty acid salts such as sodium laurate, potassium myristate, sodium palmitate, potassium oleate, sodium linolenate, sodium rosinate, and potassium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphate salts such as sodium lauryl phosphate and potassium lauryl phosphate; and the like.

Among these anionic emulsifiers, preferred are fatty acid salts, alkylbenzene sulfonates, alkyl sulfosuccinates, alkyl sulfate ester salts, and polyoxyethylene alkyl ether sulfate ester salts, and particularly preferred are fatty acid salts and alkylbenzene sulfonates.

A combination of at least one selected from the group consisting of alkylbenzene sulfonates, alkyl sulfosuccinates, alkyl sulfate ester salts, and polyoxyethylene alkyl ether sulfate ester salts and a fatty acid salt can be used to more efficiently remove a trace of residual polymerization catalyst (in particular, aluminum and titanium) derived from the synthetic polyisoprene and suppress the occurrence of aggregates in the process of producing a latex composition. In this case, preferred fatty acid salts are sodium rosinate and potassium rosinate, and preferred alkylbenzene sulfonates are sodium dodecylbenzenesulfonate and potassium dodecylbenzenesulfonate. One of these emulsifiers may be used alone, or two or more of them may be used in combination.

The above use of a combination of at least one selected from the group consisting of alkylbenzene sulfonates, alkyl sulfosuccinates, alkyl sulfate ester salts, and polyoxyethylene alkyl ether sulfate ester salts and a fatty acid salt provides a latex containing the at least one selected from the group consisting of alkylbenzene sulfonates, alkyl sulfosuccinates, alkyl sulfate ester salts, and polyoxyethylene alkyl ether sulfate ester salts, and the fatty acid salt.

Examples of ionic emulsifiers other than anionic emulsifiers include copolymerizable emulsifiers such as sulfo esters of α,β-unsaturated carboxylic acids, sulfate esters of α,β-unsaturated carboxylic acids, sulfoalkylaryl ethers, and the like.

Further, any of nonionic emulsifiers such as polyoxyethylene alkyl ethers, polyoxyethylene alkyl phenol ethers, polyoxyethylene alkyl esters, and polyoxyethylene sorbitan alkyl esters may be used in combination as long as they do not inhibit coagulation by the action of a coagulant used in dip molding.

The amount of emulsifier(s) used in the production method (1) is preferably 0.1 to 50 parts by weight, more preferably 0.5 to 30 parts by weight, still more preferably 5 to 15 parts by weight with respect to 100 parts by weight of the synthetic polyisoprene. When two or more emulsifiers are used, the total amount thereof is preferably adjusted within the above ranges. Specifically, for example, when a combination of at least one selected from the group consisting of alkylbenzene sulfonates, alkyl sulfosuccinates, alkyl sulfate ester salts, and polyoxyethylene alkyl ether sulfate ester salts and a fatty acid salt is used, the total amount of the emulsifiers used preferably falls within the above ranges. By using emulsifier(s) in an amount within the above ranges, the occurrence of aggregates during emulsification can be more effectively suppressed.

When a combination of at least one selected from the group consisting of alkylbenzene sulfonates, alkyl sulfosuccinates, alkyl sulfate ester salts, and polyoxyethylene alkyl ether sulfate ester salts and a fatty acid salt is used as an anionic emulsifier, the ratio "fatty acid salt":"total of at least one selected from the group consisting of alkylbenzene sulfonates, alkyl sulfosuccinates, alkyl sulfate ester salts, and polyoxyethylene alkyl ether sulfate ester salts" on a weight basis is in the range of preferably 1:1 to 10:1, more preferably 1:1 to 7:1. The use of at least one selected from the group consisting of alkylbenzene sulfonates, alkyl sulfosuccinates, alkyl sulfate ester salts, and polyoxyethylene alkyl ether sulfate ester salts at a ratio controlled within the ranges suppresses foaming of the synthetic polyisoprene during handling thereof. This eliminates the need of processes such as long-term standing and addition of a defoamer, leading to improved work efficiency and reduced costs.

The amount of water used in the production method (1) is preferably 10 to 1,000 parts by weight, more preferably 30 to 500 parts by weight, most preferably 50 to 100 parts by weight with respect to 100 parts by weight of the organic solvent solution of the synthetic polyisoprene. Examples of the type of water used include hard water, soft water, deionized water, distilled water, zeolite water, and the like. Preferred are soft water, deionized water, and distilled water.

To emulsify the solution or microsuspension of the synthetic polyisoprene dissolved or finely dispersed in the organic solvent, in water in the presence of the emulsifier, any apparatus commercially available as an emulsifying machine or a dispersing machine can be used without limitation. The emulsifier can be added to the solution or microsuspension of the synthetic polyisoprene in any manner without limitation, and the emulsifier may be added in advance to either or both of water and the organic solvent solution or microsuspension of the synthetic polyisoprene, or may be added all at once or in portions to the liquid to be emulsified during the emulsification process.

Examples of emulsifying machines include batch emulsifying machines such as "Homogenizer" (trade name, available from IKA Works), "POLYTRON" (trade name, available from Kinematica AG), and "TK AUTO-HOMO MIXER" (trade name, available from Tokushu Kika Kogyo Co., Ltd.); continuous emulsifying machines such as "TK PIPELINE-HOMO MIXER" (trade name, available from Tokushu Kika Kogyo Co., Ltd.), "Colloid mill" (trade name, available from Shinko Pantec Co., Ltd.), "SLASHER" (trade name, available from NIPPON COKE & ENGINEERING CO., LTD.), "Trigonal wet grinder" (trade name, available from Mitsui Miike Chemical Engineering Machinery, Co., Ltd.), "CAVITRON" (trade name, available from Eurotec, Ltd.), "MILDER" (trade name, available from Pacific Machinery & Engineering Co., Ltd.), and "FINE FLOW MILL" (trade name, available from Pacific Machinery & Engineering Co., Ltd.); high-pressure emulsifying machines such as "Microfluidizer" (trade name, available from MIZUHO INDUSTRIAL CO., LTD.), "NANOMIZER" (trade name, available from NANOMIZER Inc.), and "APV GAULIN" (trade name, available from Manton-Gaulin Company); membrane emulsifying machines such as "Membrane emulsifying machine" (trade name, available from REICA Co., Ltd.); vibratory emulsifying machines such as "VIBROMIXER" (trade name, available from REICA Co., Ltd.); ultrasonic emulsifying machines such as "Ultrasonic homogenizer" (trade name, available from Branson Ultrasonics Corporation); and the like. The conditions for the emulsification process using such an emulsifying machine are not particularly limited, and the treatment temperature, the treatment time, and the like may be appropriately selected to ensure a desired dispersion state.

In the production method (1), the organic solvent is preferably removed from the emulsion prepared through the emulsification process.

Preferred methods for removing the organic solvent from the emulsion are methods with which the amount of the organic solvent (preferably alicyclic hydrocarbon solvent or aliphatic hydrocarbon solvent) in the resulting synthetic polyisoprene latex can be reduced to 500 ppm by weight or less. For example, methods such as vacuum distillation, normal pressure distillation, water vapor distillation, and centrifugation can be employed.

The organic solvent may be removed while adding a deformer. The addition of a defoamer can prevent the synthetic polyisoprene from foaming.

Further, in order to increase the solids content of the synthetic polyisoprene latex, a concentration process by vacuum distillation, normal pressure distillation, centrifugation, membrane concentration, or the like may be performed as needed after removal of the organic solvent. In particular, centrifugation is preferably performed because it can increase the solids content of the synthetic polyisoprene latex and reduce the amount of residual emulsifier in the synthetic polyisoprene latex.

The centrifugation is preferably performed, for example, using a continuous centrifuge under the conditions in which the centrifugal force is preferably 100 to 10,000 G, the solids content of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. This process reduces the amount of residual emulsifier in the synthetic polyisoprene latex.

The solids content of the synthetic polyisoprene latex is preferably 30 to 708 by weight, more preferably 40 to 70% by weight, still more preferably 50 to 708 by weight. When the solids content is not less than the lower limit of the above ranges, a tear resistant molded film such as a tear resistant dip-molded article (described later) can be produced. When the solids content is not more than the upper limit of the above ranges, the viscosity of the synthetic polyisoprene latex will not increase too high, which facilitates transfer of the synthetic polyisoprene latex through a pipe and stirring of the synthetic polyisoprene latex in a preparation tank.

The volume average particle size of the synthetic polyisoprene latex is preferably 0.1 to 10 µm, more preferably 0.5 to 3 µm, still more preferably 0.5 to 2.0 µm. Adjusting the volume average particle size within the above ranges leads to appropriate viscosity of the latex to ensure ease of handling, and can suppress formation of a film on the surface of the latex during storage of the synthetic polyisoprene latex.

Further, the synthetic polyisoprene latex may contain additives typically used in the field of latex, such as a pH adjuster, a defoamer, a preservative, a cross-linking agent, a chelating agent, an oxygen scavenger, a dispersant, and an antioxidant.

Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Among these, preferred are alkali metal hydroxides and ammonia. Although the pH of the synthetic polyisoprene latex in the provision step is not particularly limited, it is preferable, as described later, that the pH of a latex composition prepared using materials including the synthetic polyisoprene be controlled to 10 or more before aging of the latex composition under predetermined conditions.

As described above, the conjugated diene polymer latex may be a styrene-isoprene-styrene copolymer (SIS) latex. In the term "SIS", "S" represents a styrene block, and I represents an isoprene block.

The SIS in the SIS latex can be prepared by a conventionally known method such as block copolymerization of isoprene and styrene in an inert polymerization solvent using an active organic metal such as n-butyl lithium as an initiator. Although the resulting polymer solution of SIS may be used as it is to produce an SIS latex, solid SIS may be extracted from the polymer solution and be dissolved in an organic solvent to prepare a solution, which is then used to produce an SIS latex. Any method for producing the SIS latex can be used without limitation, but preferred is a method for producing the SIS latex by emulsifying a solution or microsuspension of SIS, which is dissolved or finely dispersed in an organic solvent, in water in the presence of an emulsifier and removing the organic solvent as required.

In this case, impurities including residual polymerization catalyst in the polymer solution after synthesis may be removed. During or after polymerization, an antioxidant (described later) may be added to the solution. Alternatively, commercially available solid SIS may be used.

Examples of usable organic solvents include the same solvents as those listed for the synthetic polyisoprene. Preferred are aromatic hydrocarbon solvents and alicyclic hydrocarbon solvents, and particularly preferred are cyclohexane and toluene.

The amount of the organic solvent used is typically 50 to 2,000 parts by weight, preferably 80 to 1,000 parts by weight or less, more preferably 100 to 500 parts by weight, still more preferably 150 to 300 parts by weight relative to 100 parts by weight of the SIS.

Examples of emulsifiers include the same emulsifiers as those listed for the synthetic polyisoprene. Preferred are anionic emulsifiers, and particularly preferred are potassium rosinate and sodium dodecylbenzenesulfonate.

The amount of the emulsifier used is preferably 0.1 to 50 parts by weight, more preferably 0.5 to 30 parts by weight, still more preferably 5 to 15 parts by weight with respect to 100 parts by weight of the SIS. The use of the emulsifier in an amount within the above ranges can result in latex having enhanced stability.

The amount of water used in the aforementioned method for producing the SIS latex is preferably 10 to 1,000 parts by weight, more preferably 30 to 500 parts by weight, most preferably 50 to 100 parts by weight with respect to 100 parts by weight of the organic solvent solution of the SIS. Examples of the type of water to be used include hard water, soft water, deionized water, distilled water, zeolite water, and the like. Further, any of polar solvents typified by alcohols such as methanol may be used in combination with water.

Examples of apparatuses for emulsifying the organic solvent solution or microsuspension of the SIS in water in the presence of the emulsifier include the same apparatuses as described above for the synthetic polyisoprene. The emulsifier can be added in any manner without limitation, and the emulsifier may be added in advance to either or both of water and the organic solvent solution or microsuspension of the SIS, or may be added all at once or in portions to the liquid to be emulsified during the emulsification process.

In the aforementioned method for producing the SIS latex, the SIS latex is preferably obtained by removing the organic solvent from the emulsion obtained by the emulsification process. The organic solvent can be removed from the emulsion by any method without limitation, and methods such as vacuum distillation, normal pressure distillation, water vapor distillation, and centrifugation can be employed.

The organic solvent may be removed while adding a defoamer. The addition of a defoamer can further prevent foaming.

Further, in order to increase the solids content of the SIS latex, a concentration process by vacuum distillation, normal pressure distillation, centrifugation, membrane concentration, or the like may be performed as needed after removal of the organic solvent.

The solids content of the SIS latex is preferably 30 to 70 wt %, more preferably 40 to 70 wt %, still more preferably 50 to 70 wt %. When the solids content is not less than the lower limit of the above ranges, a tear resistant molded film such as a tear resistant dip-molded article (described later) can be produced. When the solids content is not more than the upper limit of the above ranges, the viscosity of the synthetic polyisoprene latex will not increase too high, which facilitates transfer of the SIS latex through a pipe and stirring of the SIS latex in a preparation tank.

Further, the SIS latex may contain additives generally used in the field of latex, such as a pH adjuster, a defoamer, a preservative, a cross-linking agent, a chelating agent, an oxygen scavenger, a dispersant, and an antioxidant. Examples of pH adjusters include the same pH adjusters as those described above for the synthetic polyisoprene. Preferred are alkali metal hydroxides and ammonia. Although the pH of the SIS latex in the provision step is not particularly limited, it is preferable, as described later, that the pH of a latex composition prepared using materials including the SIS latex be controlled to 10 or more before aging of the latex under predetermined conditions.

The content of styrene units in styrene blocks of the SIS contained in the SIS latex thus obtained is preferably 70 to 100 wt %, more preferably 90 to 100 wt %, further more preferably 100 wt % with respect to the total monomer units.

Further, the content of isoprene units in isoprene blocks of the SIS is preferably 70 to 100 wt %, more preferably 90 to 100 wt %, further more preferably 100 wt % with respect to the total monomer units.

The content ratio of styrene units to isoprene units in the SIS is typically in the range of 1:99 to 90:10, preferably 3:97 to 70:30, more preferably 5:95 to 50:50, further more preferably 10:90 to 30:70 as a weight ratio of "styrene units:isoprene units".

The weight average molecular weight of the SIS is preferably 10,000 to 1,000,000, more preferably 50,000 to 500,000, further more preferably 100,000 to 300,000 as calibrated against polystyrene standards by gel permeation chromatography, Adjusting the weight-average molecular weight of the SIS within the above ranges tends to result in a molded film, such as a dip-molded article, having improved balance of tensile strength and flexibility, and facilitate the production of the SIS latex.

The volume average particle size of latex particles (SIS particles) in the SIS latex is preferably 0.1 to 10 μm, more preferably 0.5 to 3 μm, still more preferably 0.5 to 2.0 μm. Adjusting the volume average particle size of the latex particles within the above ranges leads to appropriate viscosity of the latex to ensure ease of handling, and can suppress formation of a film on the surface of the latex during storage of the SIS latex.

Further, a nitrile group-containing conjugated diene copolymer latex can also be used as the conjugated diene polymer latex as described above.

The nitrile group-containing conjugated diene copolymer is a copolymer formed by copolymerization of an ethylenically unsaturated nitrile monomer with a conjugated diene monomer, and may be any of copolymers formed by copolymerization of these monomers with a different ethylenically unsaturated monomer that is copolymerizable with the former monomers and is used as needed in addition to the former monomers.

Examples of such conjugated diene monomers include 1,3-butadiene, isoprene, 2,3-dimethyl-1,3-butadiene, 2-ethyl-1,3-butadiene, 1,3-pentadiene, chloroprene, and the like. Among these, 1,3-butadiene and isoprene are preferable, and 1,3-butadiene is more preferable. One of these conjugated diene monomers may be used alone, or two or more of them may be used in combination. The content of conjugated diene monomer units formed from such conjugated diene monomer(s) in the nitrile group-containing conjugated diene copolymer is preferably 56 to 78 wt %, more preferably 56 to 73 wt %, further more preferably 56 to 68 wt %. Adjusting the content of conjugated diene monomer units within the above ranges can result in a molded film, such as a dip-molded article, having sufficient tensile strength and having a further improved texture and further improved elongation.

Such ethylenically unsaturated nitrile monomers may be any ethylenically unsaturated monomers containing a nitrile group without limitation. Examples thereof include acrylonitrile, methacrylonitrile, fumaronitrile, α-chloroacrylonitrile, α-cyanoethylacrylonitrile, and the like. Among these, acrylonitrile and methacrylonitrile are preferable, and acrylonitrile is more preferable. One of these ethylenically unsaturated nitrile monomers may be used alone, or two or more of them may be used in combination. The content of ethylenically unsaturated nitrile monomer units formed from such ethylenically unsaturated nitrile monomer(s) in the nitrile group-containing conjugated diene copolymer is preferably 20 to 40 wt %, more preferably 25 to 40 wt %, still more preferably 30 to 40 wt %. Adjusting the content of ethylenically unsaturated nitrile monomer units within the above ranges can result in a molded film, such as a dip-molded article, having sufficient tensile strength and having a further improved texture and further improved elongation.

Examples of different ethylenically unsaturated monomers that are copolymerizable with the conjugated diene monomer and the ethylenically unsaturated nitrile monomer include vinyl aromatic monomers such as styrene, alkyl styrenes, and vinylnaphthalene; fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate; cross-linkable monomers such as divinylbenzene, polyethylene glycol di(meth)acrylate, polypropylene glycol di(meth)acrylate, trimethylolpropane tri(meth)acrylate, and pentaerythritol (meth)acrylate; and the like. One of these ethylenically unsaturated monomers may be used alone, or two or more of them may be used in combination.

The content of other monomer units formed from such different ethylenically unsaturated monomer(s) in the nitrile group-containing conjugated diene copolymer is preferably 10 wt % or less, more preferably 5 wt % or less, still more preferably 3 wt % or less.

The nitrile group-containing conjugated diene copolymer can be obtained by copolymerization of a monomer mixture containing the aforementioned monomers, and a preferred method is copolymerization by emulsion polymerization. As an emulsion polymerization method, a conventionally known method can be employed.

In the emulsion polymerization of the monomer mixture containing the aforementioned monomers, polymerization auxiliary materials generally used, such as an emulsifier, a polymerization initiator, and a molecular weight modifier, can be used. These polymerization auxiliary materials can be added by any method without limitation, and any method such as initial one-time addition, portion-wise addition, and continuous addition may be employed.

Examples of emulsifiers include, but are not particularly limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as alkylbenzene sulfonates including potassium dodecylbenzene sulfonate and sodium dodecylbenzene sulfonate, higher alcohol sulfate salts, and alkyl sulfosuccinates; cationic emulsifiers such as alkyl trimethyl ammonium chlorides, dialkyl ammonium chlorides, and benzyl ammonium chloride; copolymerizable emulsifiers such as sulfo esters of $\alpha,\beta$-unsaturated carboxylic acids, sulfate esters of $\alpha,\beta$-unsaturated carboxylic acids, and sulfoalkyl aryl ethers; and the like. Among these, anionic emulsifiers are preferable, alkylbenzene sulfonates are more preferable, and potassium dodecylbenzene sulfonate and sodium dodecylbenzene sulfonate are particularly preferable. One of these emulsifiers may be used alone, or two or more of them may be used in combination. The amount of emulsifier(s) used is preferably 0.1 to 10 parts by weight with respect to 100 parts by weight of the monomer mixture.

Examples of polymerization initiators include, but are not particularly limited to, inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-$\alpha$-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. One of these polymerization initiators may be used alone, or two or more of them may be used in combination. The amount of such polymerization initiator(s) used is preferably 0.01 to 10 parts by weight, more preferably 0.01 to 2 parts by weight with respect to 100 parts by weight of the monomer mixture.

Further, the peroxide initiators can be used in combination with reductants as redox polymerization initiators. Examples of such reductants include, but are not particularly limited to, compounds containing reduced metal ions such as ferrous sulfate and cuprous naphthenate; sulfonic acid compounds such as sodium methanesulfonate; amine compounds such as dimethylaniline; and the like. One of these reductants may be used alone, or two or more of them may be used in combination. The amount of reductant(s) used is preferably 3 to 1000 parts by weight with respect to 100 parts by weight of the peroxides.

The amount of water used in the emulsion polymerization is preferably 80 to 600 parts by weight, particularly preferably 100 to 200 parts by weight with respect to 100 parts by weight of all monomers used.

Examples of methods of adding the monomers include a method of adding the monomers to be used into a reactor all at once, a method of adding monomers continuously or intermittently as the polymerization proceeds, a method of adding a portion of the monomers to react the monomers to a specific conversion ratio and then adding the remaining monomers continuously or intermittently to complete polymerization, and the like. Any one of these methods may be employed. In the case of mixing the monomers and thereafter adding the mixture continuously or intermittently, the composition of the mixture may be fixed or varied. Further, the monomers may be mixed in advance and then added into the reactor, or may be separately added into the reactor.

Further, polymerization auxiliary materials such as a chelating agent, a dispersant, a pH adjuster, an oxygen scavenger, and a particle size modifier can be used as required, and both of the type and the amount of these polymerization auxiliary materials used are not particularly limited.

The polymerization temperature during the emulsion polymerization, although not specifically limited, is typically 3 to 95° C., preferably 5 to 60° C. The polymerization time is about 5 to 40 hours.

The monomer mixture is subjected to emulsion polymerization as described above, and the polymerization reaction is stopped by cooling the polymerization system or adding a polymerization terminator at the time when a predetermined polymerization conversion ratio is reached. The polymerization conversion ratio at which the polymerization reaction is stopped is preferably 90 wt % or more, more preferably 93 wt % or more.

Examples of polymerization terminators include, but are not particularly limited to, hydroxylamine, hydroxyamine sulfate, diethylhydroxylamine, hydroxyaminesulfonic acid and alkali metal salts thereof, sodium dimethyldithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid, and hydroxydibutylbenzenedithiocarboxylic acid, and alkali metal salts thereof, alcohols such as methanol, ethanol, and isopropanol, and the like. The amount of such a polymerization terminator used is preferably 0.05 to 2 parts by weight with respect to 100 parts by weight of the monomer mixture.

After the polymerization reaction is stopped, as needed, unreacted monomers are removed, and the solids content and the pH of the product are adjusted, so that a latex of the nitrile group-containing conjugated diene copolymer can be obtained.

Further, an antioxidant, a preservative, an antibacterial agent, a dispersant, and the like may be appropriately added to the latex of the nitrile group-containing conjugated diene copolymer as required.

The number average particle size of the latex of the nitrile group-containing conjugated diene copolymer is preferably 60 to 300 nm, more preferably 80 to 150 nm. The particle size can be adjusted to a desired value, for example, by controlling the amounts of emulsifier(s) and polymerization initiator(s) used.

As described above, a deproteinized natural rubber (protein-free natural rubber) latex may be used as the conjugated diene polymer latex, One usable deproteinized rubber latex is that known as so-called "deproteinized natural rubber latex" obtained by a conventionally known protein removal method such as a method involving decomposing proteins in a natural rubber latex using agents such as a protease and a surfactant, and removing the proteins by washing, centrifugation, or the like.

Although the conjugated diene polymer used in the present invention may be a synthetic polyisoprene, a styrene-isoprene-styrene block copolymer (SIS), a nitrile group-containing conjugated diene copolymer, a deproteinized natural rubber, or the like as described above, the conjugated diene polymer is not limited to these examples, and a butadiene polymer, a styrene-butadiene copolymer, or the like may be used.

Such a butadiene polymer may be a homopolymer of 1,3-butadiene as a conjugated diene monomer, or may be a copolymer formed by copolymerization of 1,3-butadiene as a conjugated diene monomer with a different ethylenically unsaturated monomer that is copolymerizable with 1,3-butadiene.

Further, such a styrene-butadiene copolymer may be a copolymer formed by copolymerization of 1,3-butadiene as a conjugated diene monomer with styrene, or may be a copolymer formed by copolymerization of these monomers with a different ethylenically unsaturated monomer that is copolymerizable with the former monomers and is used as required in addition to the former monomers.

The conjugated diene polymer latex used in the present invention may contain additives that are generally used in the field of latex, such as a pH adjuster, a defoamer, a preservative, a chelating agent, an oxygen scavenger, a dispersant, and an antioxidant.

Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia. In the production method according to the present invention, although the pH of the conjugated diene polymer latex in the provision step is not particularly limited, it is preferable, as described below, that a latex composition prepared by adding a xanthogen compound and a sulfur-based vulcanizing agent to the conjugated diene polymer latex have a pH controlled to 9 or more after 12 hours from the start of aging of the latex composition under predetermined conditions.

Further, in order to increase the solids content of the conjugated diene polymer latex, a concentration process by vacuum distillation, normal pressure distillation, centrifugation, membrane concentration, or the like may be performed as needed. In particular, centrifugation is preferably performed because the amount of residual emulsifier in the conjugated diene polymer latex can be controlled.

In the case where the conjugated diene polymer latex is treated in a centrifuge, the pH of the latex is preferably adjusted by adding a pH adjuster in advance to 7 or more, more preferably to 9 or more in order to improve the mechanical stability of the latex.

The solids content of the conjugated diene polymer latex used in the present invention is preferably 30 to 70 wt %, more preferably 40 to 70 wt, still more preferably 50 to 70 wt %. Adjusting the solids content within the above ranges is more effective in suppressing the occurrence of aggregates in the latex, and is more effective in suppressing separation of polymer particles during storage of the latex.

<Preparation Step>

In the production method according to the present invention, a sulfur-based vulcanizing agent and a xanthogen compound are added to the conjugated diene polymer latex described above to prepare a latex composition containing these substances (preparation step).

Examples of the sulfur-based vulcanizing agent include, but are not limited to, sulfur such as powder sulfur, flowers of sulfur, precipitated sulfur, colloid sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-morpholinodithio)benzothiazole; and the like. Among these, sulfur can be preferably used. One of these sulfur-based vulcanizing agents may be used alone, or two or more of them may be used in combination.

Although the amount of the sulfur-based vulcanizing agent used is not specifically limited, it is preferably 0.01 to 10 parts by weight, more preferably 0.01 to 3 parts by weight, still more preferably 0.1 to 3 parts by weight, further more preferably 0.2 to 3 parts by weight, particularly preferably 1 to 2 parts by weight with respect to 100 parts by weight of the conjugated diene polymer contained in the latex composition. Adjusting the content of the sulfur-based vulcanizing agent within the above ranges can result in a molded film, such as a dip-molded article, which can avoid delayed (Type IV) allergic reactions and has further enhanced tensile strength.

The xanthogen compound used in the present invention can act as a vulcanization accelerator when used in combination with the sulfur-based vulcanizing agent. That is, in the case where a molded film such as a dip-molded article is formed by mixing the latex composition with the sulfur-based vulcanizing agent and vulcanizing the conjugated diene polymer in the latex composition by the action of the sulfur-based vulcanizing agent, the xanthogen compound acts as a vulcanization accelerator. Further, after vulcanization in which the xanthogen compound acts as a vulcanization accelerator in the latex composition mixed with the sulfur-based vulcanizing agent, the xanthogen compound is decomposed into, for example, alcohol and carbon disulfide after the vulcanization, due to the heat applied during the vulcanization. For example, the xanthogen compound is decomposed into alcohol and carbon disulfide due to heat applied during the production of the molded film (heat at about 100 to 130° C. in the vulcanization of the conjugated diene polymer), and then the components (such as alcohol and carbon disulfide) generated by the decomposition volatilize. As a result, the resulting molded film contains a reduced amount of residual xanthogen compound. Specifically, the method for producing a latex composition according to the present invention uses the xanthogen compound as a vulcanization accelerator without using conventional vulcanization accelerators (such as dithiocarbamate vulcanization accelerators and thiazole vulcanization accelerators) which trigger delayed (Type IV) allergic reactions, and can provide a molded film, such as a dip-molded article, containing a reduced amount of residual xanthogen compound. Therefore, the resulting molded film can avoid delayed (Type IV) allergic reactions.

Although the xanthogen compound used in the present invention is not specifically limited, examples thereof include xanthic acids, xanthates, xanthogen disulfides (compounds with two xanthic acid molecules bound via a sulfur atom or the like), xanthogen polysulfides (compounds with three or more xanthic acid molecules bound via sulfur atoms or the like), and the like.

Such xanthates are not specifically limited, and may be any compounds having a xanthate structure. Examples thereof include compounds represented by the general formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2).

Although xanthates represented by the general formula (ROC(=S)S)x-Z are not specifically limited, examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like, Among these, xanthates with x in the general formula (ROC(=S)S)x-Z being 2 or more are preferable, isopropyl xanthates and butyl xanthates are more preferable, and zinc diisopropyl xanthate and zinc dibutyl xanthate are particularly preferable, One of these xanthates may be used alone, or two or more of them may be used in combination.

Xanthogen disulfides are compounds with two xanthic acid molecules bound via sulfur atoms or the like. Examples thereof include, but are not specifically limited to, dimethyl xanthogen disulfide, diethyl xanthogen disulfide, diisopropyl xanthogen disulfide, dibutyl xanthogen disulfide, dimethyl xanthogen polysulfide, diethyl xanthogen polysulfide, diisopropyl xanthogen polysulfide, dibutyl xanthogen polysulfide, and the like. Among these, diisopropyl xanthogen disulfide and dibutyl xanthogen disulfide are preferable.

Xanthogen polysulfides are compounds with three or more xanthic acid molecules bound via sulfur atoms or the like, and examples thereof include xanthogen trisulfides with three xanthic acid molecules bound via sulfur, xanthogen tetrasulfides with four xanthic acid molecules bound via sulfur, xanthogen pentasulfides with five xanthic acid molecules bound via sulfur, and the like.

Although the latex composition may contain one of these xanthogen compounds alone, the latex composition preferably contains a combination of two or more of them. For example, in the case where the latex composition contains a xanthic acid, the latex composition may contain two or more xanthogen compounds as a result of conversion of a portion of the xanthic acid to a salt form. Alternatively, a portion of the xanthic acid mixed in the latex composition may be present in the forms of a xanthogen disulfide or a xanthogen polysulfide due to the action of the sulfur-based vulcanizing agent mixed in the latex composition. Likewise, also in the case where the latex composition contains a xanthate, a xanthogen disulfide, or a xanthogen polysulfide, these each may be present in the form of any one of a xanthic acid, a xanthate, a xanthogen disulfide, and a xanthogen polysulfide.

The amount of the xanthogen compound used (in the case where a plurality of xanthogen compounds is present, the total amount thereof) is preferably 0.01 to 10 parts by weight, more preferably 0.1 to 7 parts by weight, still more preferably 0.5 to 5 parts by weight, further more preferably 1 to 3 parts by weight with respect to 100 parts by weight of the conjugated diene polymer contained in the latex. The use of the xanthogen compound in an amount within the above ranges can result in a molded film, such as a dip-molded article, which can avoid delayed (Type IV) allergic reactions and has further enhanced tensile strength.

In the present invention, the latex composition is preferably substantially devoid of compounds conventionally used as vulcanization accelerators other than the xanthogen compound, specifically, sulfur-containing vulcanization accelerators which may trigger delayed (Type IV) allergic reactions (such as dithiocarbamate vulcanization accelerators and thiazole vulcanization accelerators) and remain in a molded film, such as a dip-molded article, after they act as vulcanization accelerators.

In the production method according to the present invention, a strong acid salt-based surfactant may be added as needed to the conjugated diene polymer latex described above in addition to the sulfur-based vulcanizing agent and the xanthogen compound.

The strong acid salt-based surfactant is not particularly limited as long as it has a structure derived from a salt formed from a strong acid and a strong base, and has interfacial activity. Examples thereof include compounds having a sulfonate group, compounds having a sulfate group or a sulfuric acid ester salt group, compounds having a phosphate group or a phosphoric acid ester salt group, compounds having a nitrate group, and the like. Among these, preferred are compounds having a sulfonate group and compounds having a phosphate group or a phosphoric acid ester salt group. One of these strong acid salt-based surfactants may be used alone, or two or more of them may be used in combination.

Compounds having a sulfonate group which can serve as strong acid salt-based surfactants may be any compounds without limitation as long as they have a salt structure having a sulfo group neutralized with a strong base. Examples thereof include sodium salts of condensation products of β-naphthalene sulfonic acid and formalin (NASF), sodium alkylbenzene sulfonates, sodium 1-hexanesulfonate, trisodium naphthalenesulfonate, and the like.

Compounds having a sulfate group or a sulfuric acid ester salt group which can serve as strong acid salt-based surfactants may be any compounds without limitation as long as they have a salt structure having a sulfuric acid group or a sulfuric acid ester group neutralized with a strong base. Examples thereof include sodium lauryl sulfate and the like.

Compounds having a phosphate group or a photographic acid ester salt group which can serve as strong acid salt-based surfactants may be any compounds without limitation as long as they have a salt structure having a phosphoric acid group or a phosphoric acid ester group neutralized with a strong base. Examples thereof include sodium lauryl phosphate, potassium lauryl phosphate, and the like.

The strong acid salt-based surfactant may be a compound having a polycyclic structure. Such a polycyclic structure may be any structure having two or more ring structures without limitation. Examples thereof include biphenyl structures including two benzene rings connected via a single bond, fused polycyclic structures formed by fusion (condensation) of two or more independent rings, and the like. The rings of such a polycyclic structure may include an aliphatic ring or may include an aromatic ring, and may contain a hetero atom. The number of rings is not particularly limited, and is preferably 2 or more. For practical reasons, the upper limit of the number of rings is about 10. Examples of fused polycyclic structures include dicyclopentadiene, naphthalene, fluorene, anthracene, phenanthrene, triphenylene, pyrene, and ovalene structures, and the like.

Examples of compounds having a polycyclic structure which can serve as strong acid salt-based surfactants include sodium salts of condensation products of β-naphthalene sulfonic acid and formalin (NASF), sodium naphthalenesulfonate, disodium naphthalenedisulfonate, trisodium naphthalenetrisulfonate, sodium butylnaphtalene sulfonate, and the like. Among these, preferred are sodium salts of condensation products of β-naphthalene sulfonic acid and formalin (NASF) which are polycyclic compounds having a sulfonate group.

The amount of the strong acid salt-based surfactant used is preferably 0.01 to 5 parts by weight, more preferably 0.1 to 4 parts by weight, still more preferably 0.5 to 3 parts by weight, further more preferably 0.8 to 1.5 parts by weigh with respect to 100 parts by weight of the conjugated diene polymer contained in the conjugated diene polymer latex. The use of the strong acid salt-based surfactant in an amount within the above ranges can result in a molded film, such as a dip-molded article, which has further enhanced tensile strength, tensile elongation, and tear strength. In the case where the strong acid salt-based surfactant is used as an emulsifier in the step of providing a conjugated diene latex, the above amount does not include the amount of the strong acid salt-based surfactant used as an emulsifier.

Specifically, for example, in the case of using a conjugated diene polymer latex prepared by emulsifying a solution or microsuspension of a conjugated diene polymer in water in the presence of the emulsifier, and optionally removing an organic solvent followed by condensation to adjust the solids content to 30 to 70 wt % (more preferably 40 to 70 wt %, still more preferably 50 to 70 wt %), the amount of the strong acid salt-based surfactant used after removing the organic solvent and adjusting the solids content to 30 to 70 wt % (more preferably 40 to 70 wt %, still more preferably 50 to 70 wt %) preferably falls within the above ranges.

The sulfur-based vulcanizing agent and the xanthogen compound can be added to the above conjugated diene polymer latex in any manner without limitation. The sulfur-based vulcanizing agent and the xanthogen compound may be added in the stated order, or may be added simultaneously. In the case where the strong acid salt-based surfactant is further added to the conjugated diene latex in addition to the sulfur-based vulcanizing agent and the xanthogen compound, these may also be added in any manner without limitation. The sulfur-based vulcanizing agent, the xanthogen compound, and the strong acid salt-based surfactant may be added in the stated order, or may be added simultaneously. Alternatively, the strong acid salt-based surfactant may be added first, followed by the sulfur-based vulcanizing agent and lastly the xanthogen compound or followed by the xanthogen compound and lastly the sulfur-based vulcanizing agent. In particular, from the viewpoint of ensuring further enhanced stability even when the pH of the latex decreases due to addition of the xanthogen compound, it is preferable that the strong acid salt-based surfactant be added first, followed by the sulfur-based vulcanizing agent and the xanthogen compound. In this case, the order of addition of the sulfur-based vulcanizing agent and the xanthogen compound is not particularly limited. Either of them may be added first, or both may be added simultaneously. The sulfur-based vulcanizing agent, the xanthogen compound, and the strong acid salt-based surfactant may be added as aqueous solutions or aqueous dispersions.

In the production method according to the present invention, an activating agent may be added as needed to the above conjugated diene polymer latex in addition to the sulfur-based vulcanizing agent and the xanthogen compound.

In the case where an activating agent is added to the latex composition, the activating agent as well as the xanthogen compound acts as a vulcanization accelerator when a molded film such as a dip-molded article is formed from the resulting latex composition by vulcanizing the conjugated diene polymer in the latex composition by the action of the sulfur-based vulcanizing agent. Consequently, the resulting molded film (e.g., dip-molded article) has further enhanced tear strength.

Although such an activating agent is not particularly limited, a metal compound is preferably used to further enhance the tear strength of the resulting molded film (dip-molded article). Examples of such metal compounds include, but are not limited to, metal oxides, metal compounds having one or more carbon atoms, and the like. Any metal may be selected as a metal component of such metal compounds without limitation. Preferred is a typical metal (at least one element selected from the group consisting of the elements of Groups 1, 2, 12, 13, 14, 15, 16, 17, and 18). More preferred are the elements of Groups 2, 12, 13, and 14, still more preferred are zinc, magnesium, calcium, aluminum, and lead, particularly preferred are zinc, magnesium, and calcium, and most preferred is zinc. One of these metal compounds may be used alone, or two or more of them may be used.

Although metal oxides are not particularly limited, zinc oxide, magnesium oxide, titanium oxide, calcium oxide, lead oxide, iron oxide, copper oxide, tin oxide, nickel oxide, chromium oxide, cobalt oxide, and aluminum oxide are preferred from the viewpoint of providing a molded film, such as a dip-molded article, having further enhanced tear strength. More preferred is zinc oxide.

Although metal compounds having one or more carbon atoms are not particularly limited, carbonates, hydrogen carbonates, hydroxides, and organic metal compounds are preferred from the viewpoint of providing a molded film, such as a dip-molded article, having further enhanced tear strength, More preferred are carbonates, hydrogen carbonates, and organic metal compounds, Among these, inorganic salts such as carbonates and hydrogen carbonates are particularly preferred from the viewpoint of high stability and high availability of the compounds.

The amount of the activating agent used is preferably 0.01 to 10 parts by weight, more preferably 0.1 to 5 parts by weight, still more preferably 1 to 3 parts by weight with respect to 100 parts by weight of the conjugated diene polymer contained in the latex composition. The use of the activating agent in an amount within the above ranges can result in a molded film, such as a dip-molded article, having further enhanced tear strength.

The activating agent can be added in any manner without limitation as long as the conjugated diene polymer latex and the activating agent are finally mixed.

Further, a vulcanization accelerator may be added to the latex composition as long as a molded film such as a dip-molded article formed from the latex composition can avoid delayed (Type IV) allergic reactions.

Examples of usable vulcanization accelerators include vulcanization accelerators conventionally used in dip molding, and examples thereof include dithiocarbamic acid compounds such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbaylthio)benzothiazole, 2-(2,6-dimethyl-4-morpholinothio)benzothiazole, 2-(4'-morpholinodithio)benzothiazole, 4-morphonilyl-2-benzothiazyl disulfide, 1,3-bis(2-benzothiazyl mercaptomethyl)urea, and the like. One of these vulcanization accelerators may be used alone, or two or more of them may be used in combination.

The latex composition can further contain optional compounding agents including an antioxidant, a dispersant, a reinforcer such as carbon black, silica, or talc, a filler such as calcium carbonate or a clay, an ultraviolet absorber, and a plasticizer.

Examples of antioxidants include sulfur atom-free phenolic antioxidants such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-α-cresol), and 2,6-di-t-butyl-4-(4,6-bis(octylthio)-1,3,5-triazin-2-ylamino)phenol; phosphite ester antioxidants such as tris (nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensation products; quinoline antioxidants such as 6-ethoxy-2,2,4-trimethyl-1,2-dihydroquinoline; hydroquinone antioxidants such as 2,5-di-(t-amyl) hydroquinone; and the like. One of these antioxidants can be used alone, or two or more of them can be used in combination.

The content of such antioxidant(s) is preferably 0.05 to 10 parts by weight, more preferably 0.1 to 5 parts by weight, still more preferably 1 to 3 parts by weight with respect to 100 parts by weight of the conjugated diene polymer.

These compounding agents can be mixed in the latex composition by any method without limitation. Examples thereof include a method involving preparing a composition containing the conjugated diene polymer latex, the sulfur-based vulcanizing agent, and the xanthogen compound as described above, and then mixing the optional compounding agents in the prepared latex composition using a disperser such as a ball mill, a kneader, or a disperser; a method involving preparing a composition containing the conjugated diene polymer latex and the strong acid salt-based vulcanizing agent, and then preparing an aqueous dispersion of the compounding ingredients other than the conjugated diene polymer latex and the strong acid salt-based vulcanizing agent using any of the aforementioned dispersers, and then mixing the aqueous dispersion with the latex composition containing the conjugated diene polymer latex and the strong acid salt-based vulcanizing agent; and the like. Some of the compounding agents may be added after aging (described later).

The solids content of the latex composition according to the present invention is preferably 10 to 60 wt %, more preferably 10 to 55 wt %.

The pH of the latex composition before aging obtained by the preparation step in the present invention is preferably controlled to 10 or more, more preferably 11 or more, still more preferably 12 or more. By controlling the pH of the latex composition before aging within the above ranges, the stability of the latex composition after aging can be further enhanced. The upper limit of the pH of the latex composition before aging is not particularly limited, and is preferably 14 or less, more preferably 13.5 or less.

<Aging Step>

In the present invention, the latex composition thus prepared is subjected to aging (pre-crosslinking). The aging can be performed through storage for 12 hours to 14 days at a temperature of 5 to 60° C.

The temperature during aging is 5 to 60° C., preferably 10 to 30° C., more preferably 10 to 25° C. Too low an aging temperature may result in a molded film, such as a dip-molded article, having insufficient mechanical properties. On the other hand, too high an aging temperature may result in a molded film, such as a dip-molded article, having reduced tensile strength.

Although the aging time depends on the aging temperature, the aging time is 12 hours to 14 days, preferably 12 hours to 10 days, more preferably 12 hours to 7 days. Too short an aging time may result in a molded film, such as a dip-molded article, having insufficient mechanical properties. On the other hand, too long an aging time may result in a molded film, such as a dip-molded article, having reduced tensile strength.

In the present invention, the pH of the latex composition after 12 hours from the start of aging in the aging step is controlled to 9 or more, preferably 9.5 or more, more preferably 10 or more. If the pH of the latex composition after 12 hours from the start of aging is lower than the above ranges, the resulting latex composition has poor stability. The pH of the latex composition tends to gradually decrease from the start of aging as a result of aging. In opposition to this tendency, the pH of the latex composition is preferably continued to be maintained at 9 or more from the start to the end of aging. More preferably, the pH is continued to be maintained within the above ranges.

In the present invention, the presence of the xanthogen compound, which does not trigger delayed (Type IV) allergic reactions, as well as the sulfur-based vulcanizing agent in the resulting conjugated diene polymer latex is effective in avoiding (Type IV) allergic reactions. On the other hand, studies by the present inventors have revealed a problem in producing a molded film such as a dip-molded article from a latex composition containing a xanthogen compound as described above after aging (pre-crosslinking). That is, such a latex composition contains a large amount of aggregates, and is therefore difficult to dip mold. In particular, this problem is more apparent when the conjugated diene polymer latex used is a carboxyl group-free conjugated diene polymer.

In response to the problem, the present inventors have made intensive studies, and found that the problem can be solved by pH control to maintain the pH of the latex composition after 12 hours from the start of aging in the step of aging the latex composition in the range of 9 or more. In particular, the studies by the present inventors have revealed that if a xanthogen compound is added to a conjugated diene polymer latex, its presence decreases the pH of the resulting latex composition during aging (pre-crosslinking). The decrease in pH during aging is a unique phenomenon observed in the presence of the xanthogen compound. Although not wishing to be bound by any particular theory, decomposition of the xanthogen compound is believed to be one reason for such a pH decrease during aging. Such a pH decrease is considered responsible for a loss of stability of the latex composition which in turn may result in the occurrence of a larger amount of aggregates in the latex composition. On the other hand, it has been found that the above problem can be solved by controlling the pH of the latex composition after 12 hours from the start of aging to 9 or more in the present invention.

Any method can be used without limitation to control the pH of the latex composition after 12 hours from the start of aging to 9 or more. Examples thereof include controlling the pH of the latex composition before aging to 11 or more in the preparation step; adding a pH adjuster to the latex composition during aging; and the like.

In the present invention, it is sufficient that the pH of the latex composition after 12 hours from the start of aging is controlled to 9 or more. Although the pH of the latex composition after aging is not particularly limited, it is preferably controlled to 9 or more, more preferably 9.5 or more, still more preferably 10 or more. By controlling the pH of the latex composition after aging within the above ranges, the stability of the resulting latex composition can be further enhanced. Although the upper limit of the pH of the latex composition after aging is not particularly limited, the pH is preferably controlled to 14 or less, more preferably 13.5 or less.

In the present invention, a pH adjuster may be added to the latex composition during or after aging to control the pH within the above ranges. Although the timing of addition of a pH adjuster to the latex composition during or after aging is not particularly limited, it is added preferably within 24 hours, more preferably within 12 hours from the start of aging from the viewpoint of increasing the pH of the latex composition after 12 hours from the start of aging as much as possible. In consideration of the tendency of the pH of the latex composition to decrease gradually from the start of aging, it is more preferable to add the pH adjuster within 1 hour from the start of aging.

Examples of pH adjusters which can be added to the latex composition after or during aging include, but are not limited to, alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides, ammonia, and organic amine compounds. One of these pH adjusters may be used alone, or two or more of these may be used in combination.

According to the method for producing a latex composition according to the present invention, by aging a latex composition before aging which contains the conjugated diene polymer latex, the sulfur-based vulcanizing agent, and the xanthogen compound, and controlling the pH of the latex composition after 12 hours from the start of aging to 9 or more, a latex composition can be obtained which itself has excellent stability and can provide a molded film, such as a dip-molded article, which can avoid delayed (Type IV) allergic reactions, and has excellent tensile strength, tensile elongation, and tear strength.

<Dip-Molded Article>

In the method for producing a dip-molded article according to the present invention, a dip-molded article can be obtained by dip molding a latex composition prepared by the production method according to the present invention described above. The dip molding is a method involving immersing a mold in the latex composition to deposit the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used as required.

Specific examples of how to use the coagulant include depositing the coagulant on the mold by immersing the mold in a coagulant solution before the immersion in the latex composition (anode coagulant dipping); immersing a mold on which the latex composition has been deposited in a coagulant solution (Teague coagulant dipping); and the like. The anode coagulant dipping is preferable in that a dip-molded article having less unevenness in thickness is obtained.

Specific examples of coagulants include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts may be used alone, or two or more of them may be used in combination.

Such coagulants can be generally used as solutions in water, an alcohol, or a mixture thereof, and are preferably used in the form of aqueous solutions. Such aqueous solutions may further contain a water-soluble organic solvent such as methanol or ethanol, and a nonionic surfactant. Although the concentration of coagulant(s) varies depending on the type of the water-soluble polyvalent metal salt, the concentration is preferably 5 to 50 wt %, more preferably 10 to 30 wt %.

The mold after pulled out of the latex composition is generally heated to dry the deposit formed on the mold. The drying conditions may be appropriately selected.

Next, the dip-molded layer deposited on the mold is cross-lined by heating. The dip-molded layer can be cross-linked by heat treatment typically at a temperature of 80 to 150° C., preferably for 10 to 130 minutes. As a heating method, external heating methods using infrared rays or heated air or internal heating methods using high-frequency waves can be employed. Among these, external heating using heated air is preferable. Before the heat treatment, the dip-molded layer may be immersed in water, preferably hot water at 30 to 70° C. for about 1 to 60 minutes to remove water-soluble impurities (such as excess emulsifier and coagulant). Although the removal of water-soluble impurities may be performed after the heat treatment of the dip-molded layer, the removal process is preferably performed before the heat treatment to more efficiently remove the water-soluble impurities.

Then, a dip-molded article is obtained by detaching the dip-molded layer from the mold for dip molding. As a detaching method, a method of peeling the film from the mold by hand or a method of peeling the film by water pressure or pressure of compressed air can be employed. After the detachment, heat treatment at a temperature of 60 to 120° C. for 10 to 120 minutes may be further performed.

The thickness of the dip-molded article is preferably 0.03 to 0.50 mm, more preferably 0.05 to 0.40 mm, particularly preferably 0.08 to 0.30 mm.

The dip-molded article obtained by the production method according to the present invention is formed using the latex composition described above, and therefore can avoid delayed (Type IV) allergic reactions and has excellent tensile strength, tensile elongation, and tear strength. For this reason, the dip-molded article can be used particularly suitably as a glove, for example. In the case where the molded film is a glove, inorganic fine particles made of talc, calcium carbonate, or the like or organic fine particles such as starch particles may be spread on the surface of the glove, an elastomer layer containing fine particles may be formed on the surface of the glove, or the surface layer of the glove may be chlorinated in order to prevent the adhesion of contacting parts of the molded film and allow the glove to be put on and taken off more smoothly.

Further, other than the aforementioned glove, the dip-molded article produced by the production method according to the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like.

EXAMPLES

Hereinafter, the present invention will be specifically described with reference to Examples. However, the present invention is not limited to these examples. The "part(s)" below is on a weight basis unless otherwise specified. The physical properties were measured as follows.

<Solids Content>

From each sample, 2 g (weight: X2) was accurately weighed on an aluminum dish (weight: X1), followed by drying in a hot air dryer at 105° C. for 2 hours. Subsequently, after cooling in a desiccator, the weight thereof (weight: X3) including the aluminum dish was measured to calculate the solids content according to the following calculation formula.

$$\text{Solids content (wt \%)} = (X3-X1) \times 100/X2$$

<Among of Aggregates>

The solids content of each latex composition was measured according to the aforementioned method, and 100 g was accurately weighed from each of the latex compositions, and was thereafter filtered with a 200-mesh SUS wire screen of known weight. Then, aggregates on the wire screen were washed with water several times to remove the latex composition. The aggregates were dried at 105° C. for 60 minutes, and thereafter the dry weight thereof was measured to calculate the amount of aggregates (unit: wt %) in percent relative to 1008 by weight of the polymer component contained in the latex composition. A smaller amount of aggregates corresponds to higher stability of the latex composition.

<External Appearance of Dip-Molded Article>

Each dip-molded article was visually observed to determine the presence or absence of aggregates adhering thereto.

<Tensile Strength and Tensile Elongation of Dip-Molded Article>

In accordance with ASIM D412, each dip-molded article was punched out using a dumbbell (trade name "SUPER DUMBBELL (type: SDMK-100C)" available from DUMBBELL CO., LTD.) to produce a test piece for tensile strength measurement. The test piece was stretched at a stretching speed of 500 mm/min using a TENSILON Universal Material Testing Instrument (trade name "RTG-1210", available from ORIENTEC CORPORATION) to measure tensile strength immediately before break (unit: MPa) and tensile elongation immediately before break (unit: %).

<Tear Strength of Dip-Molded Article>

In accordance with ASIM D624-00, each dip-molded article was allowed to stand still in a constant-temperature, constant-humidity room at 23° C. and at a relative humidity of 50% for 24 hours or more, and then was punched out using a dumbbell (trade name "Die C", available from DUMBBELL CO., LTD.) to prepare a test piece for tear strength measurement. The test piece was stretched at a stretching speed of 500 mm/min using a TENSILON Universal Material Testing Instrument (trade name "RTG-1210", available from A&D Company, Limited) to measure tear strength (unit: N/mm).

Example 1

(Production of Synthetic Polyisoprene (A-1) Latex)

Into a dried, nitrogen-purged autoclave with a stirrer, 900 parts of n-hexane and 100 parts of isoprene were fed. While controlling the temperature in the autoclave to 60° C., 0.05 parts of an n-hexane solution containing 15 wt % of n-butyl-lithium as a catalyst solution was added with stirring to react the substances for one hour. Thus, a reaction solution was prepared. The polymerization ratio was found to be 998. To the resulting reaction solution was added methanol as a polymerization terminator to terminate the reaction and afford an n-hexane solution (a-1) of a synthetic polyisoprene having a weight average molecular weight (Mw) of 1,840,000 (solids content: 10 wt %).

Meanwhile, potassium rosinate was added to water, and was dissolved therein by heating to 60° C. Thus, an emulsifier aqueous solution (b-1) with a concentration of 1.5 wt % was prepared.

Next, the n-hexane solution (a-1) of the synthetic polyisoprene prepared above and the emulsifier aqueous solution (b-1) were mixed using a mixer (trade name "Multi Line mixer MS26-MMR-5.5L", available from SATAKE CHEMICAL EQUIPMENT MFG., LTD.) in such proportions that the amount of potassium rosinate in the emulsifier aqueous solution was 10 parts with respect to 100 parts of the synthetic polyisoprene in the n-hexane solution (a-1) of the synthetic polyisoprene. The mixture was then mixed and emulsified at a rotational speed of 4100 rpm using an emulsifying apparatus (trade name "MILDER MDN310", available from Pacific Machinery & Engineering Co., Ltd.) to give an emulsified dispersion (c-1). In this process, the total feed flow rate of the n-hexane solution (a-1) of the synthetic polyisoprene and the emulsifier aqueous solution (b-1) was controlled at 2,000 kg/hr, the temperature was controlled at 60° C., and the back pressure (gauge pressure) was controlled at 0.5 MPa.

Subsequently, the emulsified dispersion (c-1) was heated to 80° C. under a reduced pressure of −0.01 to −0.09 MPa (gauge pressure) to distill off n-hexane and afford an aqueous dispersion (d-1) of the synthetic polyisoprene. In this process, a defoamer (trade name "SM5515", available from Dow Corning Toray Co., Ltd.) was continuously added by spraying the defoamer in an amount of 300 ppm by weight with respect to the synthetic polyisoprene in the emulsified dispersion (c-1). In the process of distilling off n-hexane, the emulsified dispersion (c-1) was adjusted to 70 volt or less of the tank volume, and was gradually stirred at 60 rpm using a three-bladed inclined paddle as a stirring blade.

After the completion of distilling off of n-hexane, the aqueous dispersion (d-1) of the synthetic polyisoprene obtained was concentrated by centrifugation at 8,000 to 9,000 G using a continuous centrifuge (trade name "SRG510", available from Alfa Laval AB) to give a synthetic polyisoprene (A-1) latex with a solids content of 60 wt % as a light liquid. The conditions for centrifugation were as follows: the solids content of the aqueous dispersion (d-1) before centrifugation was 8 wt %; the flow rate during continuous centrifugation was 1300 kg/hr; and the back pressure (gauge pressure) of the centrifuge was 0.1 MPa. The amount of residual potassium rosinate in the synthetic polyisoprene (A-1) latex obtained was 1 part with respect to 100 parts of the synthetic polyisoprene (A-1) in the synthetic polyisoprene (A-1) latex. The synthetic polyisoprene (A-1) had substantially no carboxyl groups.

(Preparation of Latex Composition)

While the synthetic polyisoprene (A-1) latex prepared above was being stirred, a sodium salt of a condensation product of β-naphthalene sulfonic acid and formalin (NASF, trade name "DEMOL T-45", available from Kao Corporation)) as a strong acid salt-based surfactant was added in an amount of 1.0 part on a solids content basis with respect to 100 parts of the synthetic polyisoprene (A-1) in the synthetic polyisoprene (A-1) latex. On a solids content basis with respect to 100 parts of the synthetic polyisoprene (A-1) in the resulting mixture, 2.5 parts of zinc diisopropyl xanthate as a xanthogen compound, 1.5 parts of zinc oxide, 1.5 parts of sulfur, 2 parts of an antioxidant agent (trade name "Wingstay L", available from Goodyear Tire and Rubber Company) were added as aqueous dispersions of the compounding agents to the stirred mixture. Subsequently, a potassium hydroxide aqueous solution (concentration: 5.0 wt %) was added to provide a latex composition having a pH adjusted to 12.5 (the pH of the latex composition before aging was controlled to 12.5).

(Aging of Latex Composition)

The latex composition prepared was aged for 48 hours in a temperature-constant water tank controlled at 30° C. After 12 hours from the start of aging, a potassium hydroxide aqueous solution (concentration; 5.0 wt %) was added to adjust the pH of the latex composition to 12.1. The pH of the latex composition before addition of the potassium hydroxide aqueous solution after 12 hours from the start of aging was 11.6, and the pH of the latex composition after 48-hour aging was 11.8.

During aging, the pH of the latex composition gradually decreased until after 12 hours from the start of aging to reach the pH of the latex after 12 hours from the start of aging (the same applies to the following examples and comparative examples). Namely, the pH of the latex composition during aging was continued to be maintained equal to or higher than the pH of the latex composition after 12 hours from the start of aging. In the Example 1, for example, the pH of the latex composition at the start of aging was 12.6, the pH decreased gradually, and the pH of the latex composition after 12 hours from the start of aging was 11.6. In other words, the pH of the latex composition was continued to be maintained at 11.6 or more from the start of aging to after 12 hours.

(Production of Dip-Molded Article)

A commercially available ceramic hand mold (available from SHINKO CERAMICS CO., LTD.) was washed, followed by preheating in an oven at 70° C. Thereafter, the hand mold was immersed in a coagulant aqueous solution containing 18 wt % of calcium nitrate and 0.05 wt % of polyoxyethylene lauryl ether (trade name "EMULGEN 109P", available from Kao Corporation) for 5 seconds, and was taken out of the coagulant aqueous solution. Subsequently, the hand mold was dried in an oven at 70° C. for 30 minutes or more, thereby allowing the coagulant to deposit on the hand mold, so that the hand mold was coated with the coagulant.

Thereafter, the hand mold coated with the coagulant was taken out of the oven, and was immersed for 10 seconds in the latex composition after 48-hour aging. Subsequently, the hand mold was air-dried at room temperature for 10 minutes, and was immersed in hot water at 60° C. for 5 minutes to elute water-soluble impurities, thereby forming a dip-molded layer on the hand mold. Thereafter, the dip-molded layer formed on the hand mold was cross-linked by heating in an oven at 130° C. for 30 minutes, followed by cooling to room temperature, and was separated from the hand mold after spreading talc to obtain a dip-molded article (rubber glove). Then, the resulting dip-molded article (rubber glove) was evaluated for amount of aggregates, external appearance, tensile strength, tensile elongation, and tear strength according to the aforementioned methods, Table 1 shows the results. The dip-molded article (rubber glove) obtained had a good external appearance, and no problem was observed (the same applies to those of the following examples).

Example 2

A latex composition before aging having a pH of 11.1 was prepared in the same manner as in Example 1 except that the amount of the pH adjuster (potassium hydroxide aqueous solution) added to the latex composition before aging was changed. The resulting latex composition before aging was aged for 48 hours in the same manner as in Example 1. In Example 2, the potassium hydroxide aqueous solution (concentration: 5 wt %) was added to the latex composition after 12 hours from the start of aging to adjust the pH of the latex composition to 11.0. The pH of the latex composition before addition of the potassium hydroxide aqueous solution after 12 hours from the start of aging was 10.4, and the pH of the latex composition after the 48-hour aging was 10.8. Using the latex composition after 48-hour aging, a dip-molded article (rubber glove) was produced in the same manner as in Example 1, and was likewise evaluated. The results are shown in Table 1.

Example 3

A latex composition before aging having a pH of 11.1 was prepared in the same manner as in Example 1 except that the amount of the pH adjuster (potassium hydroxide aqueous solution) added to the latex composition before aging was changed. The resulting latex composition before aging was aged for 48 hours in the same manner as in Example 1. In Example 3, the pH adjuster (potassium hydroxide aqueous solution) was not added to the latex composition after 12 hours from the start of aging. The pH of the latex composition after 12 hours from the start of aging was 10.4, and the pH of the latex composition after the aging was 10.1. Using the latex composition after 48-hour aging, a dip-molded article (rubber glove) was produced in the same manner as in Example 1, and was likewise evaluated. The results are shown in Table 1.

Example 4

A latex composition before aging having a pH of 11.1 was prepared in the same manner as in Example 1 except that the sodium salt of a condensation product of β-naphthalene sulfonic acid and formalin (NASF) was not added to the latex composition before aging and the amount of the pH adjuster (potassium hydroxide aqueous solution) added to the latex composition before aging was changed. The resulting latex composition before aging was aged for 48 hours in the same manner as in Example 1, In Example 4, the pH adjuster (potassium hydroxide aqueous solution) was not added to the latex composition after 12 hours from the start of aging. The pH of the latex composition after 12 hours from the start of aging was 10.5, and the pH of the latex composition after aging was 10.2. Using the latex composition after 48-hour aging, a dip-molded article (rubber glove) was produced in the same manner as in Example 1, and was likewise evaluated. The results are shown in Table 1.

Example 5

A latex composition before aging was prepared in the same manner as in Example 4. The pH of the latex composition before aging thus obtained was 11.1. The latex composition before aging thus obtained was aged for 48 hours in the same manner as in Example 1 except that the temperature of the temperature-constant water tank was set to 25° C. In Example 5, the pH adjuster (potassium hydroxide aqueous solution) was not added to the latex composition after 12 hours from the start of aging. The pH of the latex composition after 12 hours from the start of aging was 10.3, and the pH of the latex composition after aging was 10.1. Using the latex composition after 48-hour aging, a dip-molded article (rubber glove) was produced in the same manner as in Example 1, and was likewise evaluated. The results are shown in Table 1.

Comparative Example 1

A latex composition before aging having a pH of 9.5 was prepared in the same manner as in Example 1 except that the amount of the pH adjuster (potassium hydroxide aqueous solution) added to the latex composition before aging was changed. The resulting latex composition before aging was aged for 48 hours in the same manner as in Example 1. In Comparative Example 1, the pH adjuster (potassium hydroxide aqueous solution) was not added to the latex composition after 12 hours from the start of aging. The pH of the latex composition after 12 hours from the start of aging was 8.5, and the pH of the latex composition after the aging was 8.2. Using the latex composition after 48-hour aging, a dip-molded article (rubber glove) was produced in the same manner as in Example 1, and was likewise evaluated. The results are shown in Table 1. Visual observation of the external appearance of the dip-molded article (rubber glove) obtained in Comparative Example 1 confirmed the presence of several aggregates adhering thereto.

Comparative Example 2

A latex composition before aging having a pH of 9.5 was prepared in the same manner as in Example 1 except that the sodium salt of a condensation product of β-naphthalene sulfonic acid and formalin (NASF) was not added to the latex composition before aging and the amount of the pH adjuster (potassium hydroxide aqueous solution) added to the latex composition before aging was changed. The resulting latex composition before aging was aged for 48 hours in the same manner as in Example 1. In Comparative Example 2, the pH adjuster (potassium hydroxide aqueous solution) was not added to the latex composition after 12 hours from the start of aging. The pH of the latex composition after 12 hours from the start of aging was 8.3, and the pH of the latex composition after aging was 8.1. The latex composition prepared in Comparative Example 1 contained a significant amount of aggregates (amount of aggregates: 52.5 wt %), and therefore a dip-molded article could not be formed therefrom. The results are shown in Table 1.
[Table 1]

TABLE 1

|  |  | Example | | | | | Comparative Example | |
|---|---|---|---|---|---|---|---|---|
|  |  | 1 | 2 | 3 | 4 | 5 | 1 | 2 |
| Composition | | | | | | | | |
| Synthetic polyisoprene (A-1) | (parts) | 100 | 100 | 100 | 100 | 100 | 100 | 100 |
| Sodium salt of condensation product of β- | (parts) | 1.0 | 1.0 | 1.0 | — | — | 1.0 | — |

TABLE 1-continued

|  |  | Example | | | | | Comparative Example | |
|---|---|---|---|---|---|---|---|---|
|  |  | 1 | 2 | 3 | 4 | 5 | 1 | 2 |
| naphthalene sulfonic acid and formalin |  |  |  |  |  |  |  |  |
| Zinc diisopropyl xanthate | (parts) | 2.5 | 2.5 | 2.5 | 2.5 | 2.5 | 2.5 | 2.5 |
| Zinc oxide | (parts) | 1.5 | 1.5 | 1.5 | 1.5 | 1.5 | 1.5 | 1.5 |
| Sulfur | (parts) | 1.5 | 1.5 | 1.5 | 1.5 | 1.5 | 1.5 | 1.5 |
| Aging step |  |  |  |  |  |  |  |  |
| Aging temperature | (° C.) | 30 | 30 | 30 | 30 | 25 | 30 | 30 |
| pH of latex composition |  |  |  |  |  |  |  |  |
| pH of latex composition before aging |  | 12.5 | 11.1 | 11.1 | 11.1 | 11.1 | 9.5 | 9.5 |
| pH of latex composition after 12-hour aging |  | 11.6 | 10.4 | 10.4 | 10.5 | 10.3 | 8.5 | 8.3 |
| pH of latex composition after 12-hour aging after pH adjustment |  | 12.1 | 11.0 | No pH control | | | | |
| pH of latex composition after aging |  | 11.8 | 10.8 | 10.1 | 10.2 | 10.1 | 8.2 | 8.1 |
| Evaluations |  |  |  |  |  |  |  |  |
| Amount of aggregates | (wt %) | <0.1 | 0.2 | 0.5 | 1.1 | 0.7 | 7.7 | 52.5 |
| External appearance |  | No defect | No defect | No defect | No defect | No defect | Several aggregates | — |
| Tensile strength of dip-molded article | (MPa) | 25.2 | 24.4 | 23.7 | 23 | 23.2 | 16.4 | — |
| Tensile elongation of dip-molded article | (%) | 952 | 918 | 922 | 890 | 880 | 916 | — |
| Tear strength of dip-molded article | (N/mm) | 42.4 | 40.5 | 40.1 | 38.8 | 39.9 | 20.2 | — |

As shown in Table 1, latex compositions which had excellent stability and could suppress the occurrence of aggregates could be prepared by the production method which comprises adding a sulfur-based vulcanizing agent and a xanthogen compound to a provided conjugated diene polymer latex to prepare a latex composition before aging, and then aging the latex composition before aging, and comprises controlling the pH of the latex composition after 12 hours from the start of aging to 9 or more. Additionally, the dip-molded articles formed therefrom had excellent tensile strength, tensile elongation, and tear strength (Examples 1 to 5). Because the latex compositions were devoid of any Type IV allergy-inducing vulcanization accelerators, it is presumed that the dip-molded articles formed therefrom can also avoid delayed (Type IV) allergic reactions.

On the other hand, in the case where the pH after 12 hours from the start of aging was less than 9, the resulting latex compositions had poor stability. One of them contained a large amount of aggregates, and therefore a dip-molded article could not be formed therefrom (Comparative Example 2). Although a dip-molded article could be produced from the other, the resulting dip-molded article had aggregates adhering thereto and had poor tensile strength and tear strength (Comparative Example 1).

The invention claimed is:

1. A method for producing a latex composition, comprising:
  a provision step of providing a conjugated diene polymer latex;
  a preparation step of adding a sulfur-based vulcanizing agent and a xanthogen compound to the conjugated diene polymer latex to prepare a latex composition before aging; and
  an aging step of, after the preparation of the latex composition before aging, aging the prepared latex composition before aging through storing of the latex composition at a temperature of 5 to 60° C. for 12 hours to 14 days,
  wherein:
  the aging step comprises adding a pH adjuster to the latex composition during aging, and
  the pH of the latex composition after 12 hours from the start of aging in the aging step is controlled to 9 or more.

2. The method for producing a latex composition according to claim 1, wherein the preparation step comprises controlling the pH of the latex composition before aging to 11 or more.

3. The method for producing a latex composition according to claim 1, wherein the pH adjuster comprises at least one selected from alkali hydroxides, ammonia, and organic amine compounds.

4. The method for producing a latex composition according to claim 1, wherein the amount of the sulfur-based vulcanizing agent used is 0.01 to 3 parts by weight with respect to 100 parts by weight of the conjugated diene polymer contained in the conjugated diene polymer latex.

5. The method for producing a latex composition according to claim 1, wherein the amount of the xanthogen compound used is 0.01 to 10 parts by weight with respect to 100 parts by weight of the conjugated diene polymer contained in the conjugated diene polymer latex.

6. The method for producing a latex composition according to claim 1, wherein the preparation step comprises further adding a strong acid salt-based surfactant to the conjugated diene polymer latex.

7. The method for producing a latex composition according to claim 1, wherein the conjugated diene polymer latex is a synthetic polyisoprene latex, a styrene-isoprene-styrene block copolymer latex, or a protein-free natural rubber latex.

8. The method for producing a latex composition according to claim 1, wherein the conjugated diene polymer latex is a latex of a conjugated diene polymer having no carboxyl groups.

9. A method for producing a dip-molded article, comprising the step of dip molding a latex composition produced by the production method according to claim 1.

* * * * *